Figure 1:
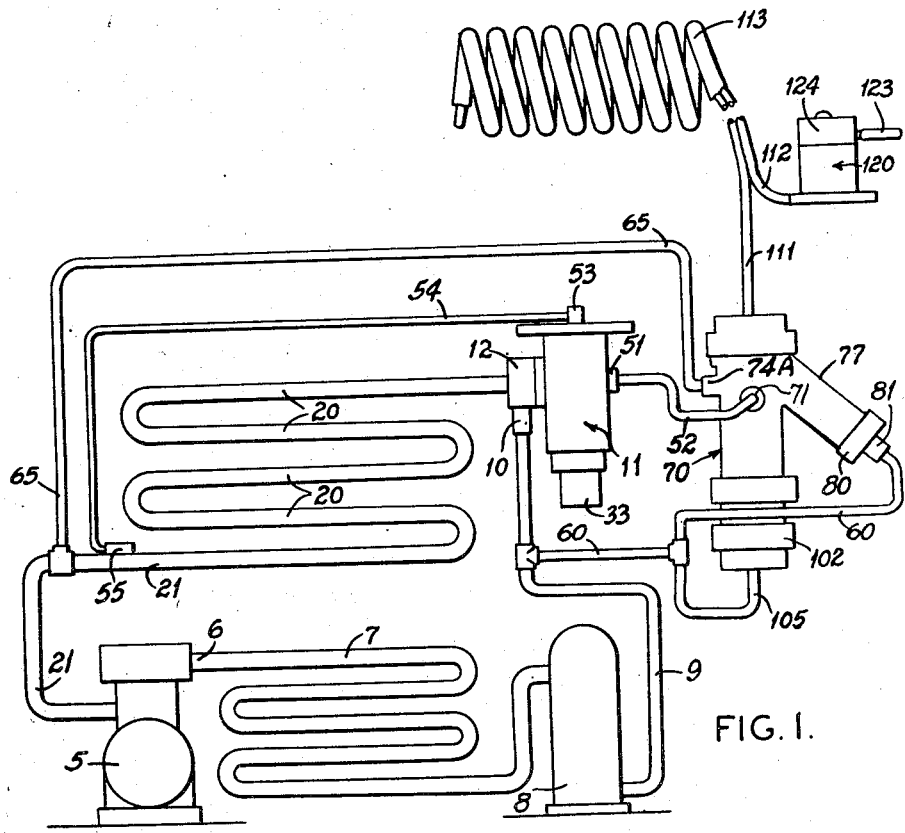

June 6, 1950   H. T. LANGE   2,510,405
REFRIGERATING FLUID CONTROL
Filed July 26, 1945   2 Sheets-Sheet 1

INVENTOR
HAROLD T. LANGE
BY
ATTORNEY

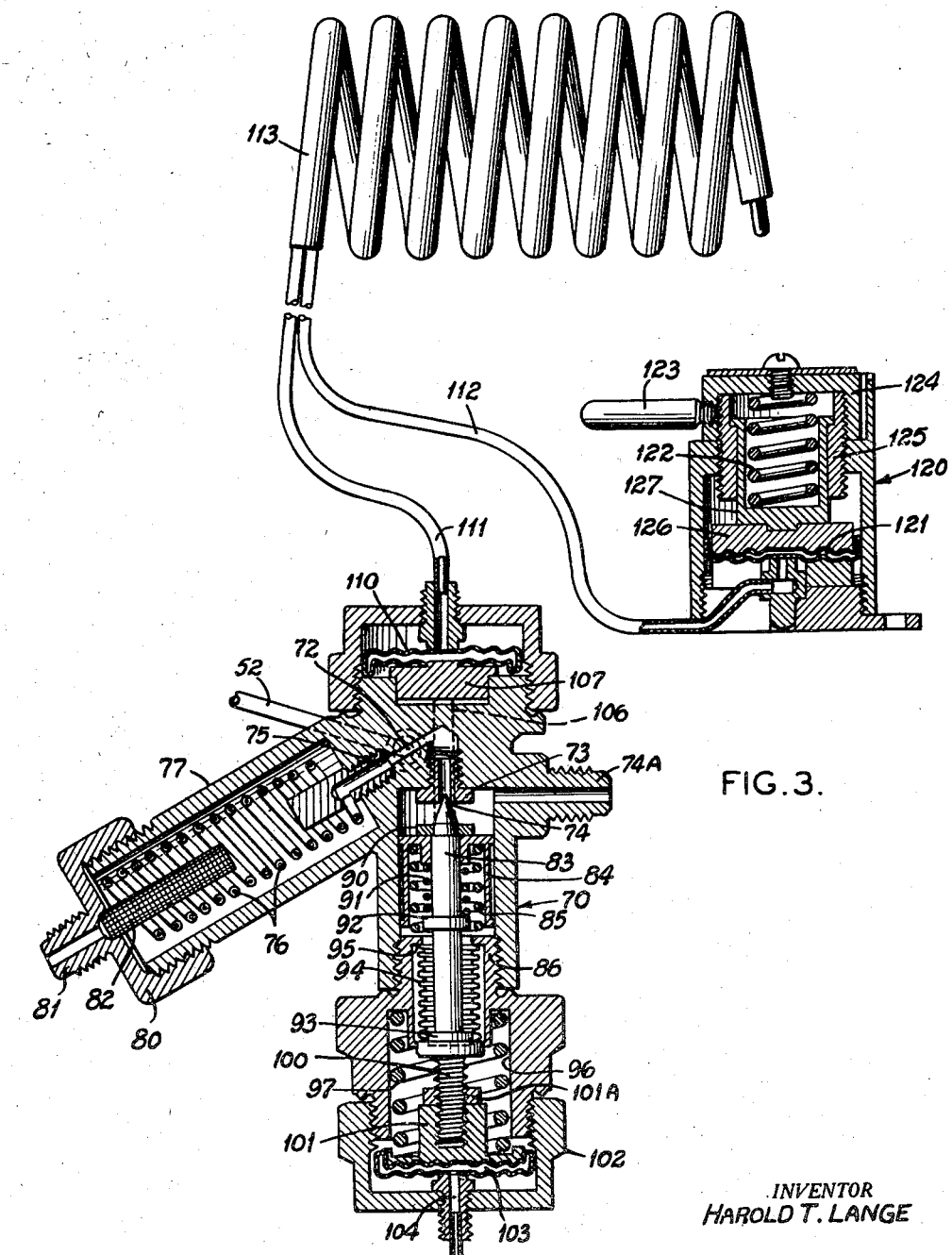

Patented June 6, 1950

2,510,405

UNITED STATES PATENT OFFICE 2,510,405

REFRIGERATING FLUID CONTROL

Harold T. Lange, Webster Groves, Mo., assignor to Sporlan Valve Company, Maplewood, Mo., a corporation of Missouri Application July 26, 1945, Serial No. 607,218

14 Claims. (Cl. 62—2)

This invention relates to improvements in refrigerating fluid control, and more particularly to improved means for the regulation of refrigerant in systems for air cooling and conditioning uses, including also certain advanced methods of control of liquid refrigerant flow.

The present application constitutes certain additions to and improvements on the subject matter disclosed and claimed in Letters Patent No. 2,258,458, issued October 7, 1941, to an assignee of this applicant. The flow and control systems disclosed in the patent, utilize a by-pass line of tubing including a leak passage in the by-pass line, which line is further disclosed as controlled by electromagnetic valves responsive to thermostatic and humidostatic regulation according to requirements of the air in the space to be cooled. In certain fields of usage, as in vehicles including aircraft, buses, etc., and in other systems wherein the control elements are subjected to at least some degree of vibration, it has been found desirable to substitute controls of such nature as not to be adversely affected by vibration. In still other installations it is sometimes desired to utilize control motors of fluid column type in lieu of electrical instruments. The present improvements accordingly objectively provide an improved mode of regulation and improved apparatus for effecting a control flow through a by-pass fluid circuit of the general nature disclosed in the patent above mentioned.

Yet another objective of the present improvements is attained in an improved arrangement and combination of control agencies of fluid type, for a compressor-condenser-evaporator system, which serve to provide a multiple range evaporator operation of such nature that the evaporator may be operated under any of a plurality of distinct working conditions including full capacity operation and other conditions under which the evaporator will operate at distinctly less than full working capacity, yet under accurate and sensitive control.

A still further object of importance is attained in the provision of certain improved modifying controls in a system of compressor-condenser-evaporator type utilizing a thermostatic expansion valve which is controlled in part by the modifying controls arranged in a by-pass or shunt flow circuit such as described in the patent aforesaid.

Yet another object of the invention is attained in an improved combination of features of refrigerant flow control, including a novel control of refrigerant flow which is responsive to any of various predetermined head pressures in the system, such control being coordinated with the regulation afforded by the primary thermostatic expansion valve, and further coordinated in flow control effects, with regulatory valve movements responsive to a fluid column type of space thermostat.

Still another object of the invention is importantly attained by a novel provision of divided refrigerant flow circuits and the provision of a regulating flow control in each of such branches, with arrangements for maintaining fluid communication between the branches, for example, between the separate flow control valve assemblies respectively serving the flow circuits.

Figure 2:
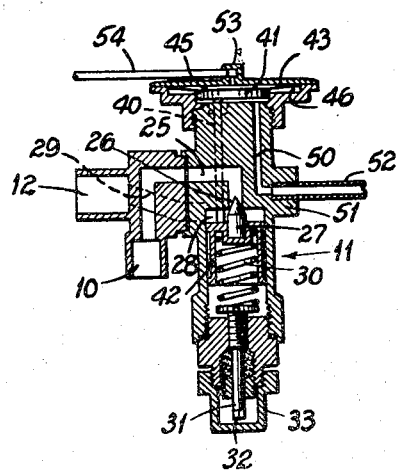

The foregoing and numerous other objects and advantages will more particularly appear from the following detailed description of a preferred embodiment, considered in connection with the accompanying drawing, in which:

Fig. 1 is a schematic or diagrammatic view of a refrigeration system to which the present improvements are applied;

Fig. 2 is a vertical sectional elevation of a thermostatic expansion valve of one type suitable for use in the system of Fig. 1, and Fig. 3 is a sectional elevation of a by-pass control valve assembly to which is connected a liquid column type of thermostat for use as a space sensitive instrument, there being connected to the latter, a combined pressure relief and regulating valve unit, the valve units or assemblies in this figure being shown in vertical section.

Referring now by characters of reference to the drawing, and first to the system exemplified by Fig. 1, this includes a compressor 5, driven by any suitable source of power (not shown) and having its discharge line 6 communicating through suitable piping with a condenser 7. The condenser is in turn connected with a liquid receiver 8, and the outlet from the receiver is found in a liquid line 9. The line 9 is connected to the inlet fitting 10 of a thermostatic expansion valve having the general designation 11, and provided with the usual liquid outlet port or fitting 12. Although there are a number of types of thermostatic expansion valves which may be employed in the present system and in practice of the method to be described, there is shown for completeness by Fig. 2, a suitable construction, which will be later described in detail.

The outlet 12 of the valve assembly or unit 11 is, as is usual, connected to the inlet of the evaporator 20, the latter being provided with an outlet to piping 21 which provides a return line to compressor 5, the various piping interconnecting the units 7, 8, 9, 11 and 20, together with the compressor, forming a closed refrigerant circuit which, as thus far described, is or may be of more or less conventional order.

The thermostatic expansion valve shown by Fig. 2 includes in connection with the inlet 10, an inside passage 25 directed to the port 26 which is controlled by the valve element 27. This valve is subjected to a limited vertical movement when mounted in the position shown by Fig. 2, so that it serves to govern the flow of liquid into the valve chamber 28 from which flow occurs by way of passage 29 into the outlet fitting 12, thence to the evaporator. In the valve unit shown, downward movement of the valve 27 is opposed by a spring 30 bearing on a valve guide member in which the valve 27 is seated, the spring being adjustably loaded as through a screw 31 provided with an adjusting head 32 accessible upon removal of the cap 33. For the purpose of effecting and controlling the movement of valve 27, one or more, preferably a pair of actuating rods 40 bear against the valve guide at their lower ends, one of the rods 40 being shown in dotted lines by Fig. 2. The rods 40 are suitably packed to prevent escape of fluid therealong, and serve to constitute a rigid operative connection between a pressure plate 41 which lies immediately adjacent a flexible diaphragm 43, and the valve holder or guide 42. The space above the diaphragm is identified with chamber 45 and on the opposite side of the diaphragm is a chamber 46. It will be noted that chamber 46 communicates with an internal duct 50 to a connection or outlet fitting 51 and duct or tube 52. The tube 52 as will appear from Fig. 1, communicates with an auxiliary control valve body later to be described. A fluid connection for control of the expansion valve of Fig. 2 is made to the upper chamber 45, being the space above the diaphragm 43, as through a fitting 53, tubing 54, and a superheat-responsive thermostatic bulb 55 (Fig. 1). It should be noted further that, apart from the connection of chamber 46, duct 50 and tube 52 and the resulting influence of diaphragm 43, hence valve 27, by the novel control assembly to be described, this assembly may consist essentially of the corresponding structure shown and described in Patent No. 2,258,458. In order better to correlate the structure thus far described with that of the patent aforesaid, corresponding reference numerals have thus far been employed where applicable.

In the earlier structure the connection afforded by tube 52 leads directly into a by-pass flow circuit beyond a capillary portion or leak passage. The present improvements utilize a considerably advanced and highly sensitive control in a by-pass branch or shunt flow path of a refrigerating circuit generally similar to, yet importantly differing in refinements of its control, from that earlier disclosed. For this present purpose there is utilized the arrangement shown by Fig. 3, in which an assembly indicated generally at 70, is provided with several external fluid connections including a fitting (not shown) for reception of the tube 52, the flow circuit relation of which will appear from Figs. 1 and 2. The tube 52 communicates through a port 71 (Fig. 1) directed into a chamber 72 immediately above a threaded fitting 73 in which is formed a valve port 74. The port 71 opens into an internal passage 75 which is in effect, a continuation of a substantial length, say 12 to 20 feet, of capillary tubing arranged in spiral form and shown at 76, within a barrel 77 forming an angle extension of body 70, and being closed at its outer end by a threaded cap 80 provided with an external connection 81, the passage through which, by way of a strainer 82, opens into the chamber in fitting 77, to which is also open the inlet end of a length of the capillary tubing 76. Thus it will appear that the spiral capillary tubing of the present disclosure forms an improved and extended counterpart of the leak passages of the earlier disclosure. Connection 81 is completed as through a line of tubing 60 back to line 9, constituting a part of the high pressure side of the system and containing fluid at substantially receiver pressure. The opposite side of the casing forming the body of unit 70, is provided with an externally threaded projection 74A communicating within the body of the unit, with a chamber just below valve port 74, and is externally connected to the suction side of the system by a line of piping 65 which, as through a T connection, communicates with line 21 heretofore described.

Proceeding now to describe the by-pass valve sembly and the method of its actuation, it will appear that the unit 70 is provided with a longitudinal axial bore below the valve seat or port 74. Operable within and along the longitudinal bore is the valve pin or rod 83 the conical head of which coacts as a valve with the seat or port 74. Valve pin 83 operates in a hollow, generally cylindrical guide element 84 which, because of its length, accurately centers the pin 83 in the bore, and by reason of its open interior construction serves to receive at least a portion of a valve return spring 85. The latter seats against a threaded end closure 86 for the bore, and thus the spring finds a lower abutment on the member 86.

A collar or bridge element 90 is secured adjacent a shoulder on the upper end of the pin 83, and against the collar bears the upper surface of the guide 84. A relatively lightly loaded spring 91, abuts upwardly against an inturned shoulder of the valve guide, and its lower end engages a collar or projection 92 on the pin 83. The pin 83 projects well into the hollow closure element 86 as shown, and may be provided with an enlarged head 93 at its end opposite the valve. To this head is secured in fluid tight relation a sealing bellows 94, the lower end of which is imperforate and the upper end of which is sealed as by soldering, to inturned flanges 95 at the upper end of element 86.

The closure 86 is provided with a bore 96 in its lower portion, and located therein is a relatively heavily loaded coil compression spring 97 serving a purpose later to be described. Located below the head 93 and beyond the sealing bellows 94, is shown a male threaded element 100 coacting with a companion internally threaded element 101, the related elements constituting a valve pin abutment as will better later appear. Closure of the bore 96 is effected by an internally threaded cap 102 and located therein in a position directly to engage the member 101, is a fluid motor exemplified by expansible bellows 103, the interior of the bellows being in communication through a passage 104 with tube 105. Attention is now directed to Fig. 1, from which it appears that tube 105, as through a T fitting, communicates with line 60, hence is subjected to the pressure thereof and so is constantly subject to substantially the head pressure of the system. It will now have appeared that by selectively threadedly interconnecting the parts 100 and 101, the effective length of the abutment, hence in fact the effective length of the valve stem structure as a whole, may be varied.

Considered in its broader aspect, the valve stem structure although composite in that it is composed of assembled elements, is extended upwardly of the valve pin 83 as through a plurality, preferably a pair, of actuating rods 106, one of which is shown in dotted lines in Fig. 3. These rods are fixed to a pressure plate 107, which is directly impinged by an expansible fluid motor element exemplified by bellows 110, the latter through tubing 111, is part of a liquid-column thermostat, later described. The opposite ends of rods 106 impinge, without securement, on the top of valve guide 84. This lost-motion arrangement permits the pressure of plate 107 to depress guide 84. If bellows 103 is contracted, then pin 83 will follow guide 84, but if this bellows be extended, then valve pin 83 and the valve stay closed, while permitting movement of guide 84, spring 91 being further compressed. This arrangement avoids high mechanical stress on rods 106, and very importantly, permits the head pressure of motor 103 to close the valve independently of position of bellows 110. Thus even though the thermostat requires valve 83 to open, it is nevertheless held closed if head pressure exceeds the pre-set limit. As to the sealing bellows 94, it should be noted that this element exerts a relatively minor force against the pressure exerted by bellows 103, which force is nullified by reducing slightly the compressive loading of spring 97. It should further be noted that the usual variations in suction pressure which might tend to alter the effect of bellows 94, are negligible, due to the fact that the relative areas of bellows 103 and 94 are approximately, in a preferred construction, 5:1. Air at atmospheric pressure surrounds the outside of bellows 103 as well as the other elements in this enclosure. It should be noted that in case a leak occurs in any of the operating fluid motors such as bellows 110, 103 or 94, no refrigerant could escape to atmosphere.

Proceeding now to a description of the liquid column thermostat system including the bellows 110, the line of tubing 111 heretofore mentioned, is supplemented by a companion length of tubing 112, both of these lines being connected into a spirally formed bulb 113 located in the space or medium to be conditioned, or as may be desired, subjected to the flow of air or other fluid to or from such space. The system including the bulb and tubing elements 111—112, is preferably charged with a highly expansive liquid from which air is virtually completely excluded. A suitable liquid for this purpose, of which there are several, consists of a charge of xylol.

For purposes of caring for expansion and regulation of the liquid column thermostat, there is provided an adjustable spring loading unit generally indicated at 120, and including an adjustment and pressure relief bellows 121. Since the temperature of the medium surrounding the bulb 113 determines the volume of liquid therein, the volume of the system including the paired lengths of tubing and other portions thereof, and the two bellows 110 and 121, determines the position of the bellows 110. This volume is modified by bellows 121, connected to line 112 for the purpose of varying the adjustment. A relief spring 122 allows the bellows 121 to expand in a manner to relieve excessive internal pressure of the xylol temperature becomes too high for the safety of the apparatus.

Adjustment of space temperature maintained by the system is varied by means of a handle 123 which serves to rotate a threaded member 124, fixedly engaging a threaded member 125 which rotates with member 124. Rotation of parts 123, 124 and 125 acts upon a plate 126 bearing against bellows 121, to vary the bellows volume. The arrangement is such that under conditions of excessive expansion of bellows 121, a hollow spring holder 127 centrally interfitting the plate 126 as shown, is permitted to slide upwardly within the bore of member 125, but without rotation with the threaded elements. The raising of plate 126 and the spring retaining member 127 will, now obviously, serve to relieve excessive pressure without damage or breakage of the fluid system. The thermostat just described, together with its regulation and pressure relief provisions, are not per se claimed herein, being described more fully in applicant's copending application Serial No. 561,109, filed October 30, 1944, and entitled "Refrigerant flow control means." The foregoing description appears herein for better understanding of present subject matter.

It will have appeared that the present system, similarly to that shown by Lange Patent No. 2,258,458 utilizes an arrangement comprising two branched refrigerant flow circuits, or otherwise considered, a principal or major flow circuit including condenser 7, receiver 8, line 9, the principal thermostatic expansion valve 11, evaporator 20 and return or suction line 21, together with compressor 5, in a closed circuit. The fluid flow path otherwise referred to as a minor or auxiliary line arranged in shunt relation to a portion of the major flow line, includes the by-pass elements beginning with line 60, barrel 77, capillary tubing 76, passage 75, chamber 72, valve seat or port 74, connections 74A and the line 65, back to suction line 21. As in the patented structure the similarly numbered interconnecting tube 52 is employed, and serves to connect the by-pass circuit from a zone beyond the capillary or leak passage, with the chamber 46 below the diaphragm 43.

The present arrangement, though not restricted as to its applications in service, is particularly adapted for use with those systems as in bus and vehicle installations, wherein the compressor is operatively connected with a vehicle propulsion engine or the like, hence is continuously operating. Such installations usually do not employ a suction pressure switch, such as commonly utilized with electrically driven compressors for starting and stopping same.

The flow of refrigerant through the principal or major flow circuit will have been obvious from the foregoing description. It may be noted for completeness that the flow through the load control unit in the by-pass or shunt circuit, is from conduit 60, thence as described through the leak passage provided by capillary tubing 76, thence into chamber 72 and with the valve port 74 open, by way of fitting 74A and line 65, back to suction. It will be noted that the fluid motor such as bellows 110 is also surrounded by refrigerant at a pressure corresponding to suction pressure in the system, this pressure being transmitted through the hydraulic system, finally to the spring 122. It is of course contemplated, and so is here disclosed, as possible to limit the suction pressure of the refrigerating system by proportioning the strength of spring 122 so that it moves at a predetermined suction pressure as well as in response to a predetermined high temperature of the bulb 113. In normal operation however, in the structure as usually utilized, the suction pressure will have no effect on the position of the bellows 110.

The device identified with the unit 70 and its internal and immediately appurtenant parts, provides a load-limiting control or, according to adjustment a load-regulating control. An important function thereof, as will now have appeared from description of parts and flow circuits, is to supplement the usual temperature control modulation of the main thermostatic expansion valve 11, with an additional and independent modulating effect to prevent the head pressure from exceeding a predetermined value. The result is accomplished by modulating the thermostatic expansion valve toward the closed position to reduce the suction pressure, and consequently the refrigeration load. Now obviously, a relatively quick reduction of head pressure in the system will thus result. The aforesaid modulation is accomplished by the bellows 103 connected as described, to the high pressure side of the system. Upon expansion of the bellows, the valve pin 83, hence the valve, is moved toward a closed position against the valve port 74. This is accomplished by pressure on the abutment or push plate 101 which, acting through the companion threaded element 100 and against the outside of the bottom wall of the sealing bellows 94, operates the valve pin 83 by direct axial action. It may here be noted that the effect of the valve closing pressure of the bellows 103 is opposed by calibrating the spring 97. By presetting the compression loading of this spring, the effect of the pressure in bellows 103 may be balanced at any reasonable head pressure, as an example of usual practice, 230 p. s. i. Whenever head pressures exist below the preset value, the element 100 will be held away from the valve pin 83, and the suction pressure, (assuming it for present description to be above atmospheric) will serve to hold the bottom of the sealing bellows 94 against the head of member 100 so that a space will exist between the lower end (in the drawing) and the sealing bellows. This possible spacing will permit the valve pin to be influenced only by the position of the temperature-responsive bellows 110.

Assuming, however, that the head pressure in the system exceeds the value corresponding to the current head pressure setting, the spring 97 will be further compressed and the bellows 103 will expand and actuate the pin 83 upwardly against the seat 74, thus closing the valve and throttling or terminating flow through the by-pass circuit, regardless of the position of the temperature responsive bellows 110. Even if the bellows 110 be expanded and actuate the guide 84 downwardly, it still would not operate to move the valve pin 83 in a corresponding direction, since the spring 91 would compress. It will be noted that this spring is proportioned as to its loading, so as to compress at a relatively small pressure, much less than the force exerted by the bellows 103. Because of this fact, the bellows 103 is enabled to close the valve regardless of the condition and position of the thermostatic bellows 110.

The foregoing description of operation of the unit 70, has been predicated primarily on its function solely as a load-limiting control. It will now have appeared obvious, however, that the adjustment provided for by the threadedly connected members 100 and 101, between which is provided a jamb nut 101A, enables the device to be utilized as a load modulating control, since it may now be adjusted to close the coacting valve elements 83, 74 upon attainment of any of a reasonable range of predetermined head pressures in the system.

It is felt unnecessary to point out that the present arrangement functions importantly through its modulating effect on the thermostatic valve 11. As described in detail in Patent 2,258,458, the same function obtains in the present arrangement, in which the variable pressure under the thermostatic valve diaphragm from suction pressure to head pressure is determined by the position of valve 83.

In the foregoing description and in the claims, reference is made to the function of the assembly as a space cooling system, this phraseology being intended in a broad sense, as denoting a refrigerating load, for whatever purpose.

The structure as described and the method of operation will now have appeared fully to attain the several objectives above expressly noted, and others implied from the more detailed description. Although the description of an exemplary embodiment has detailed a preferred arrangement, the detail of description is to be understood solely in an instructive and not in a limiting sense, numerous variants being possible within the terms of the appended claims without departure from their full intended spirit and scope.

I claim as my invention:

1. In a space refrigerating system including a thermostatic expansion valve unit provided with a movable valve controlling portion, a by-pass conduit between the high and low pressure parts of the system, and connected into the expansion unit so that the by-passed fluid is in influencing relation to the movable valve controlling portion of the unit, a valve in the by-pass conduit, a valve stem structure, two fluid motors operatively associated with opposite ends of the valve stem structure, a thermostat responsive to temperature of the space to be cooled and operatively connected to one of said fluid motors, and a connection from the other fluid motor into the high pressure side of the refrigerating system for influencing the operation of the latter motor.

2. In a space cooling system, a thermostatic expansion valve unit provided with a movable valve controlling portion, a by-pass conduit between the high and low pressure portions of the system and connected into the expansion valve unit so that the by-passed fluid is in influencing relation to the movable valve-controlling portion of said unit, a control valve for the by-pass, a stem for said valve and a pair of fluid motors in opposing actuating relation to the valve stem and valve, one of said motors being responsive in movement, to variations in temperature of the space being cooled, and the other of said motors being responsive to variations in head pressure in the system.

3. In a space cooling system including a compressor, a condenser, a thermostatic expansion valve unit characterized by a movable valve-controlling member, and an evaporator, piping connected between high pressure and low pressure portions of the system so as to constitute an auxiliary by-pass conduit, said piping further including a connection into the expansion valve unit whereby the by-passed fluid pressure variations may influence the movable valve controlling member of said unit, a second valve in flow controlling relation in the piping constituting the by-pass, a thermostat subject to temperature of the air being treated by the system operatively connected with and in influencing relation to the second valve, a fluid motor also in influencing relation to said valve, and a fluid connection from said fluid motor to a high pressure side of the system for subjecting said fluid motor to pressure variations thereof.

4. In a refrigerating system, a compressor, a condenser, an evaporator, conduits whereby said elements are connected in a closed system, a thermostatic expansion valve assembly in said system and including a fluid motor having a connection with the expansion valve, an auxiliary flow circuit of piping by-passing the thermostatic expansion valve assembly from high side to low side of the system, and a branch flow connection from said by-pass piping to the fluid motor of said thermostatic expansion valve assembly, such as to subject the motor element thereof to fluid pressures fluctuating in proportion to changes in head pressure in the system, and an auxiliary fluid-pressure-operated valve assembly in the auxiliary flow circuit, the auxiliary valve assembly including a pair of opposed fluid motors, one of said motors being subject to pressure in the auxiliary flow circuit ahead of the auxiliary valve, and a thermostat of an expansible fluid column type influenced by temperature of the space to be cooled by the system, said thermostat being connected to the other of said fluid motors, whereby to subject said latter fluid motor to space temperature variations.

5. In a refrigeration system of a compressor-condenser-evaporator type in which the evaporator is arranged in cooling relation to a space, a main refrigerant flow circuit of piping, an auxiliary flow control circuit of piping, each interconnecting high and low pressure portions of the system, a main flow control valve for liquid refrigerant in the main flow circuit, an auxiliary flow control valve in the auxiliary circuit, fluid motor means and connections thereto arranged for influencing the main flow control valve in accordance with variations in superheat conditions beyond the evaporator and further in accordance with a pressure valve fluctuating in accordance with changes in head pressure in the system, and a combination of fluid motor control means in influencing relation to the auxiliary control valve, one such means tending to open the auxiliary flow control valve in thermostatic response to increase in temperature of the space to be cooled and another of said means tending to close the auxiliary valve in response to increase in head pressures as reflected in the auxiliary flow circuit.

6. In a refrigeration system of a compressor-condenser-evaporator type in which said elements are connected in a closed circuit, a main refrigerant flow control valve, control means for said valve responsive to superheat and further responsive to changes in head pressure in the system, an auxiliary refrigerant flow control valve, a by-pass circuit in which said valve is arranged, said by-pass circuit being connected between a high and low pressure zone of the closed circuit, and fluid pressure means connected in said by-pass circuit and operable to close said auxiliary flow control valve in response to attainment of predetermined head pressures in the system.

7. In a refrigeration system of compressor-condenser-evaporator type, a thermostatic expansion valve unit for controlling the flow of liquid refrigerant to the evaporator of the system, and including a fluid motor operatively connected therewith and subjected to actuation in accordance with varying degrees of superheat in the system, a by-pass flow circuit forming a shunt flow path for refrigerant from a zone ahead of the expansion valve to a low pressure zone beyond the evaporator, an auxiliary control valve in said by-pass circuit, a connection from the by-pass to the fluid motor of the thermostatic expansion valve unit to effect a pressure influence on the motor element thereof, a hydromechanical device arranged to act on the auxiliary control valve in response to variation in temperature of the space cooled by the system, motor means operatively connected in said by-pass circuit for further subjecting the auxiliary control valve to a fluid pressure fluctuating proportionately to changes in head pressure values in the system, said by-pass shunt flow circuit further including a substantial length of capillary-passage-forming means located in such circuit ahead of the auxiliary control valve in the line of flow through the by-pass circuit, and further located ahead of the connection between the by-pass circuit and the thermostatic expansion valve unit, and a fluid connection between said by-pass circuit adjacent said capillary-passage forming means and said expansion valve fluid motor whereby the latter motor is subjected to pressure variations in the by-pass circuit.

8. The herein described method of regulating the flow of liquid refrigerant in a space cooling system of compressor-condenser-evaporator type, which consists in dividing a flow of liquid refrigerant into branch circuits each connecting high and low portions of the system, and further including the steps of causing superheat conditions in the system to control said flow through the first of said circuits, and in controlling the flow in another of the branch circuits responsively to variations in a fluid pressure which fluctuates in response to increase and decrease in temperature of the space to be cooled by the system, and further controlling flow in the latter branch circuit responsively to attainment of predetermined head pressures in the system.

9. In a refrigerant flow control unit for use in a by-pass branch of a space cooling refrigerant flow circuit as in a compressor-condenser-evaporator system, a valve body, two oppositely acting bellows within opposite end portions of the body, a flow control valve operable in said body, a valve rod structure having opposite ends arranged to be acted upon by the respective bellows, a system head pressure connection to one of said bellows, a thermostatically responsive fluid column having a connection with the other of said bellows, said fluid column being subject to the space cooling effect of the system and means for adjusting the effective total length of the valve rod portions extended between said bellows, to alter the oppositely acting effect of said bellows upon said valve.

10. In an auxiliary control valve assembly for use in a by-pass refrigerant flow line of a compressor-condenser-evaporator refrigerating system, an enclosing valve body, two opposed bellows near opposite ends and internally of said body, a valve, a valve seat, a valve rod structure formed of connected elements such that the valve rod structure has its opposite ends operatively engaged by the bellows, one of the elements of said valve rod structure being integral with said valve, means providing for a connection of one of said bellows to a high pressure zone of the system with which it is used, a thermostatically responsive fluid column connected to the other said bellows, means for adjusting the effective total length of the valve rod, the valve and valve seat being so arranged intermediate the respective bellows that expansion of fluid in the thermostatically responsive column operates to urge the valve in an opening direction, and such that increase in head pressures acts upon the other bellows, in a direction tending to close the valve upon its seat, responsively to increase of head pressures.

11. An auxiliary load limiting control for a refrigerating system of compressor-condenser-evaporator type including a by-pass conduit between high and low pressure sides of the system and a valve assembly for controlling the by-pass conduit, the valve assembly including a body having a longitudinal bore therein, a valve stem reciprocally movable axially in said bore, a hollow stem guide in said bore, a valve closure spring extended into the guide, a sealing plug threaded into the end of said bore, the sealing plug providing an abutment for the valve closure spring, a movable stem abutment coaxial with the stem, a bellows adjacent an opposite side of said abutment and coacting axially therewith, a head pressure connection to said bellows, a spring urging said abutment in opposition to expansive movement of said bellows, a second bellows coaxial with the stem, valve operating elements connecting the second bellows to the stem in a manner to effect valve opening actuation responsively to a sufficient expansion of the second said bellows, and a thermostatically responsive fluid system connected into and including said second bellows.

12. An auxiliary load limiting control for a refrigerating system of compressor-condenser-evaporator type including a by-pass conduit between high and low pressure sides of the system, and a valve assembly for controlling the by-pass conduit, the valve assembly including a body having a longitudinal bore therein, a valve stem reciprocally movable axially in said bore, a hollow stem guide working in said bore and normally movable with the stem, a valve closure spring extended into the guide, a sealing plug threaded into the end of said bore, the sealing plug providing an abutment for the valve closure spring, a movable stem abutment coaxial with the stem, a bellows adjacent an opposite side of said abutment and in contacting relation for coacting axially therewith, a head pressure connection to said bellows, a spring urging said abutment in opposition to movement of said abutment in response to expansive movement of said bellows, a second bellows coaxial with the stem, valve operating elements connecting the second bellows to the stem in a manner to effect valve opening actuation responsively to a sufficient expansion of the second said bellows, and a thermostatically responsive fluid system connected into and including said second bellows.

13. An auxiliary load limiting control for a refrigerating system of compressor-condenser-evaporator type including a by-pass conduit between high and low pressure sides of the system, and a valve assembly for controlling the by-pass conduit, the valve assembly including a body having a longitudinal bore therein, a valve stem reciprocally movable in said bore, a stem guide structure in said bore and normally movable with the stem, the stem being formed of threadedly connected elements adapted to permit adjustment in the total effective stem length, a valve closure spring in the bore, a tubular sealing unit having one end tightly secured about a portion of the stem remote from the valve, a bore sealing member in an end portion of the bore and to which another end of the tubular sealing element is secured in fluid tight relation, the sealing member providing an abutment for the valve closure spring, a movable stem abutment, a bellows coacting with said stem abutment, a head pressure connection to said bellows, a spring urging said abutment in opposition to expansive movement of said bellows, a second bellows coacting with the stem, valve operating elements connecting the second bellows to the stem, and a thermostatically responsive fluid system connected into said second bellows.

14. An auxiliary load limiting control for a refrigerating system of compressor-condenser-evaporator type including a by-pass conduit between high and low pressure sides of the system, a valve assembly for controlling the by-pass conduit, the valve assembly including a body having a longitudinal bore therein, a valve stem reciprocally movable axially in said bore, a hollow stem guide working in said bore and normally movable with the stem, a valve closure spring extended into the guide, a tubular sealing unit having one end tightly secured about a portion of the stem remote from the valve, a sealing plug threaded into the end of said bore, and to which another end of the tubular sealing element is secured in fluid tight relation, the sealing plug providing an abutment for the valve closure spring, a movable stem abutment coaxial with the stem, a bellows adjacent an opposite side of said abutment and coacting axially therewith, a head pressure connection to said bellows, a spring urging said abutment in opposition to expansive movement of said bellows, a second bellows coaxial with the stem, valve operating elements connecting the second bellows to the stem in a manner to effect a valve opening actuation responsively to a sufficient expansion of the second said bellows, and a thermostatically responsive fluid system connected into said second bellows.

HAROLD T. LANGE.

REFERENCES CITED

The following references are of record in the file of this patent:

UNITED STATES PATENTS

| Number | Name | Date |
|---|---|---|
| 2,258,458 | Lange | Oct. 7, 1941 |
| 2,410,795 | Dillman | Nov. 5, 1946 |